United States Patent
Sadiq et al.

(10) Patent No.: US 10,951,287 B2
(45) Date of Patent: Mar. 16, 2021

(54) NODE-SPECIFIC PERMUTATION OF THE ORDER OF TRANSMISSION OF POSITIONING BEACON BEAMS

(71) Applicant: QUALCOMM Incorporated, San Diego, CA (US)

(72) Inventors: Bilal Sadiq, Basking Ridge, NJ (US); Navid Abedini, Somerset, NJ (US); Muhammad Nazmul Islam, Littleton, MA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/423,859

(22) Filed: May 28, 2019

(65) Prior Publication Data
US 2019/0372640 A1    Dec. 5, 2019

Related U.S. Application Data

(60) Provisional application No. 62/678,248, filed on May 30, 2018.

(51) Int. Cl.
| | |
|---|---|
| *H04L 12/50* | (2006.01) |
| *H04B 7/06* | (2006.01) |
| *H04W 72/08* | (2009.01) |
| *H04W 72/04* | (2009.01) |

(52) U.S. Cl.
CPC ........ *H04B 7/0617* (2013.01); *H04W 72/046* (2013.01); *H04W 72/082* (2013.01)

(58) Field of Classification Search
CPC ...................................................... H04L 12/28
See application file for complete search history.

(56) References Cited

U.S. PATENT DOCUMENTS

| | | | | |
|---|---|---|---|---|
| 4,704,565 A | * | 11/1987 | Blacker, Jr. ............ | H01J 29/51 313/412 |
| 2014/0269581 A1 | | 9/2014 | Song et al. | |
| 2017/0054534 A1 | | 2/2017 | Sang et al. | |

FOREIGN PATENT DOCUMENTS

WO    2018028958 A1    2/2018

OTHER PUBLICATIONS

International Search Report and Written Opinion—PCT/US2019/034379—ISA/EPO—dated Aug. 16, 2019.

* cited by examiner

*Primary Examiner* — Dang T Ton
(74) *Attorney, Agent, or Firm* — Thien T. Nguyen

(57) ABSTRACT

Disclosed are techniques and apparatuses for transmitting positioning beacon beams including transmitting a plurality of positioning beacon beams from a first node in a first time period using a first order of transmission. Then, the first node transmits the plurality of positioning beacon beams from a second time period using a second order of transmission, where the first order of transmission is different in the second order of transmission.

30 Claims, 10 Drawing Sheets

NODE-SPECIFIC PERMUTATION OF THE ORDER OF TRANSMISSION OF POSITIONING BEACON BEAMS

CROSS-REFERENCE TO RELATED APPLICATION

The present application for patent claims the benefit of U.S. Provisional Patent Application No. 62/678,248 entitled "NODE-SPECIFIC PERMUTATION OF THE ORDER OF TRANSMISSION OF POSITIONING BEACON BEAMS," filed May 30, 2018, assigned to the assignee hereof, and expressly incorporated herein by reference in its entirety.

TECHNICAL FIELD

Various aspects described herein generally relate to wireless communication systems, and more particularly, to transmission schemes for positioning beacon beams.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand. Additionally, since multiple nodes (e.g., BSs) may be transmitting positioning beacon beams at the same time, the beams from the adjacent nodes may interfere with each other causing a further degradation of the beam of interest at the receiving node.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for transmitting positioning beacon beams includes transmitting a plurality of positioning beacon beams from a first node in a first time period using a first order of transmission; and transmitting the plurality of positioning beacon beams from the first node in a second time period using a second order of transmission, wherein the first order of transmission is different from the second order of transmission.

In another aspect, an apparatus configured to transmit positioning beacon beams, including a transceiver of a first node configured to transmit a plurality of positioning beacon beams from a first node in a first time period using a first order of transmission. The transceiver of the first node is further configured to transmit the plurality of positioning beacon beams from the first node in a second time period using a second order of transmission, wherein the first order of transmission is different from the second order of transmission.

In another aspect, an apparatus for transmitting positioning beacon beams, includes means for transmitting a plurality of positioning beacon beams from a first node in a first time period using a first order of transmission. Additionally, the apparatus includes means for transmitting the plurality of positioning beacon beams from the first node in a second time period using a second order of transmission, wherein the first order of transmission is different from the second order of transmission.

In another aspect, a non-transitory computer-readable medium storing at least one computer-executable instruction for transmitting positioning beacon beams, the at least one computer-executable instruction includes at least one instruction to transmit a plurality of positioning beacon beams from a first node in a first time period using a first order of transmission. Additionally, the non-transitory computer-readable medium includes at least one instruction to transmit the plurality of positioning beacon beams from the first node in a second time period using a second order of transmission, wherein the first order of transmission is different from the second order of transmission.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
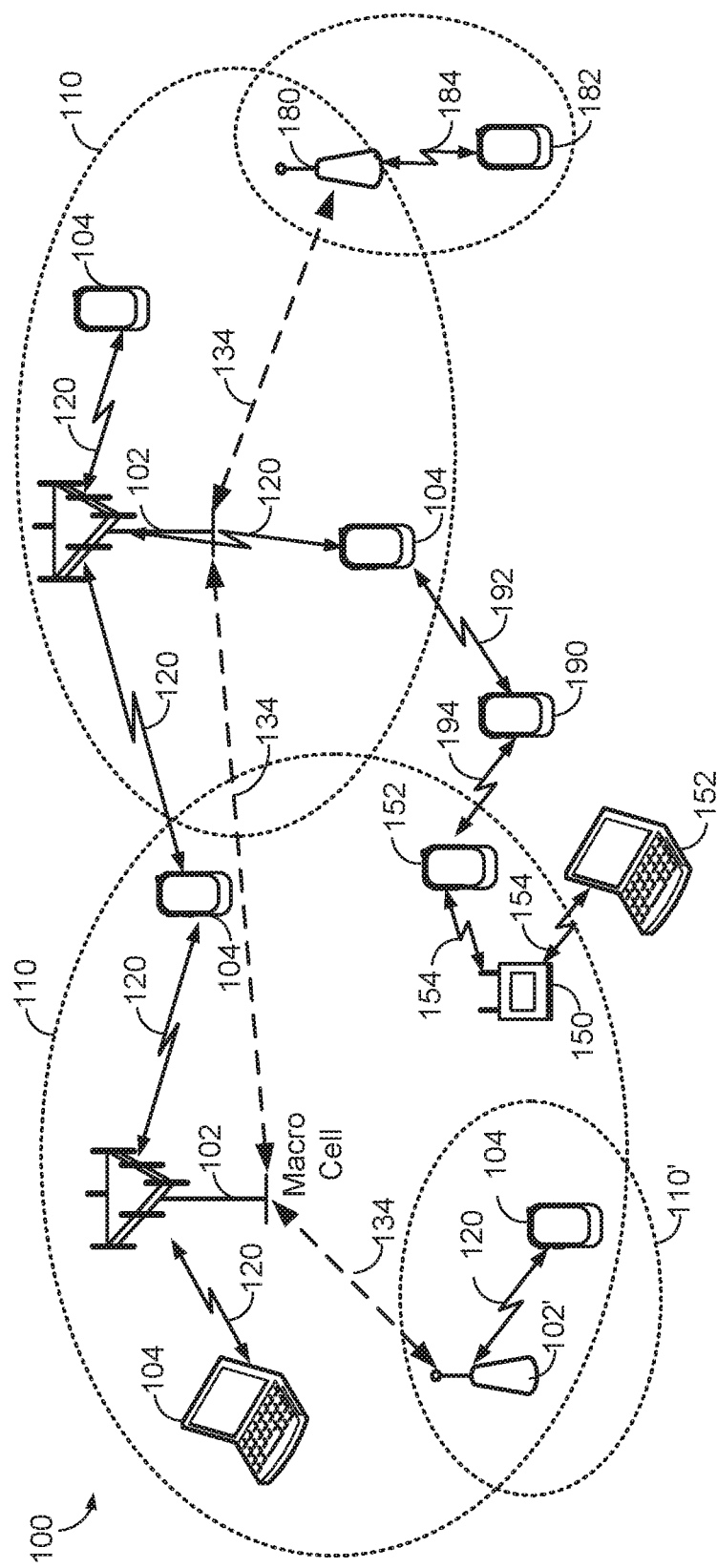
FIG. 1 illustrates an exemplary wireless communications system, according to various aspects.

Various aspects described herein generally relate to wireless communication systems, and more particularly, to transmitting positioning beacon beams. In an aspect, a method for transmitting positioning beacon beams includes transmitting a plurality of positioning beacon beams from a first node in a first time period using a first order of transmission; and transmitting the plurality of positioning beacon beams from the first node in a second time period using a second order of transmission, wherein the first order of transmission is different from the second order of transmission These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
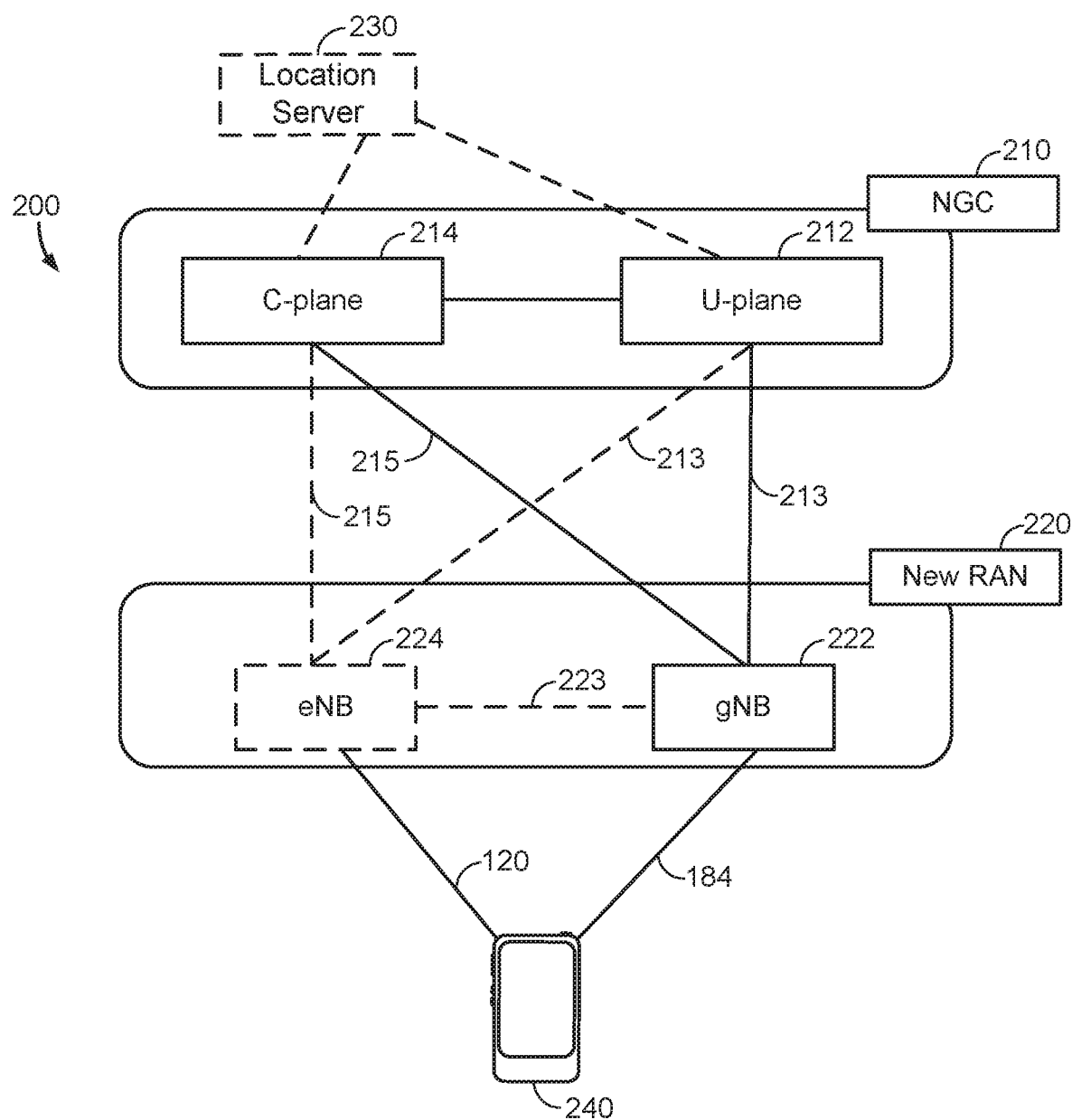
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
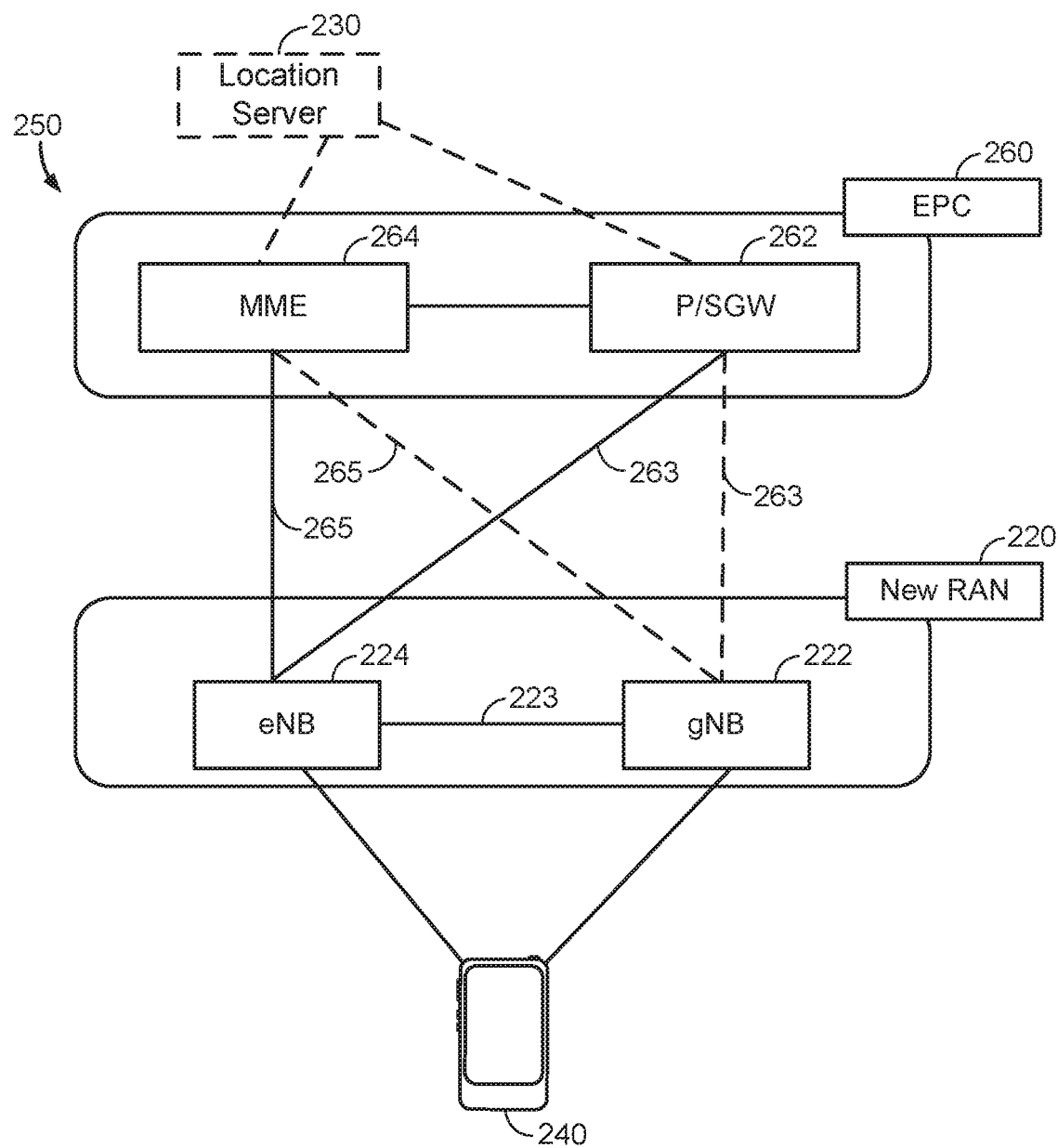

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. 51 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3:
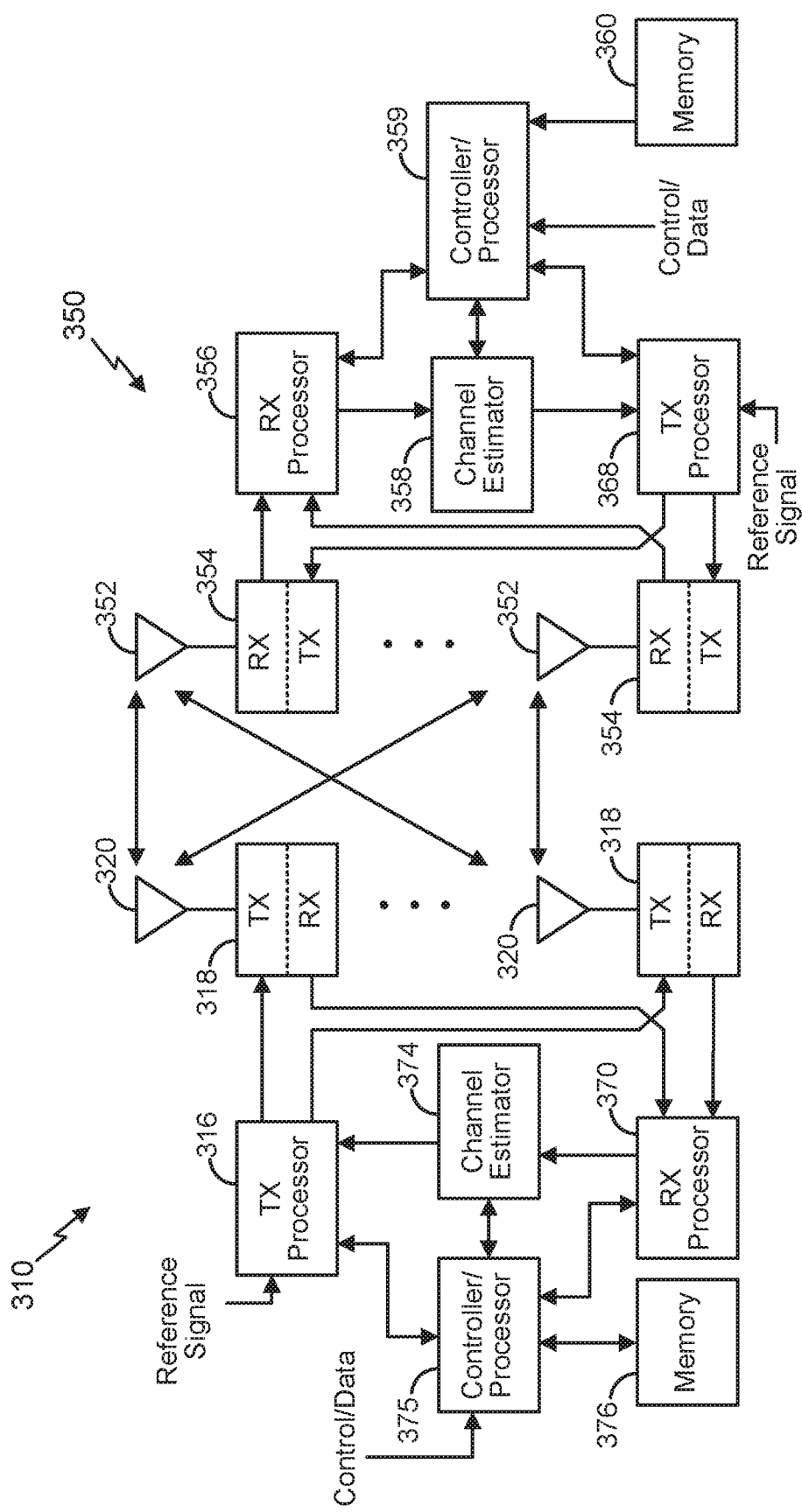
FIG. 3 illustrates an exemplary base station and an exemplary UE in an access network, according to various aspects.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter TX 318. Each transmitter TX 318 may modulate an RF carrier with a respective spatial stream for transmission.

At the UE 350, each receiver RX 354 receives a signal through its respective antenna 352. Each receiver RX 354 recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters TX 354. Each transmitter TX 354 may modulate an RF carrier with a respective spatial stream for transmission.

The UL transmission is processed at the base station 310 in a manner similar to that described in connection with the receiver function at the UE 350. Each receiver RX 318 receives a signal through its respective antenna 320. Each receiver RX 318 recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
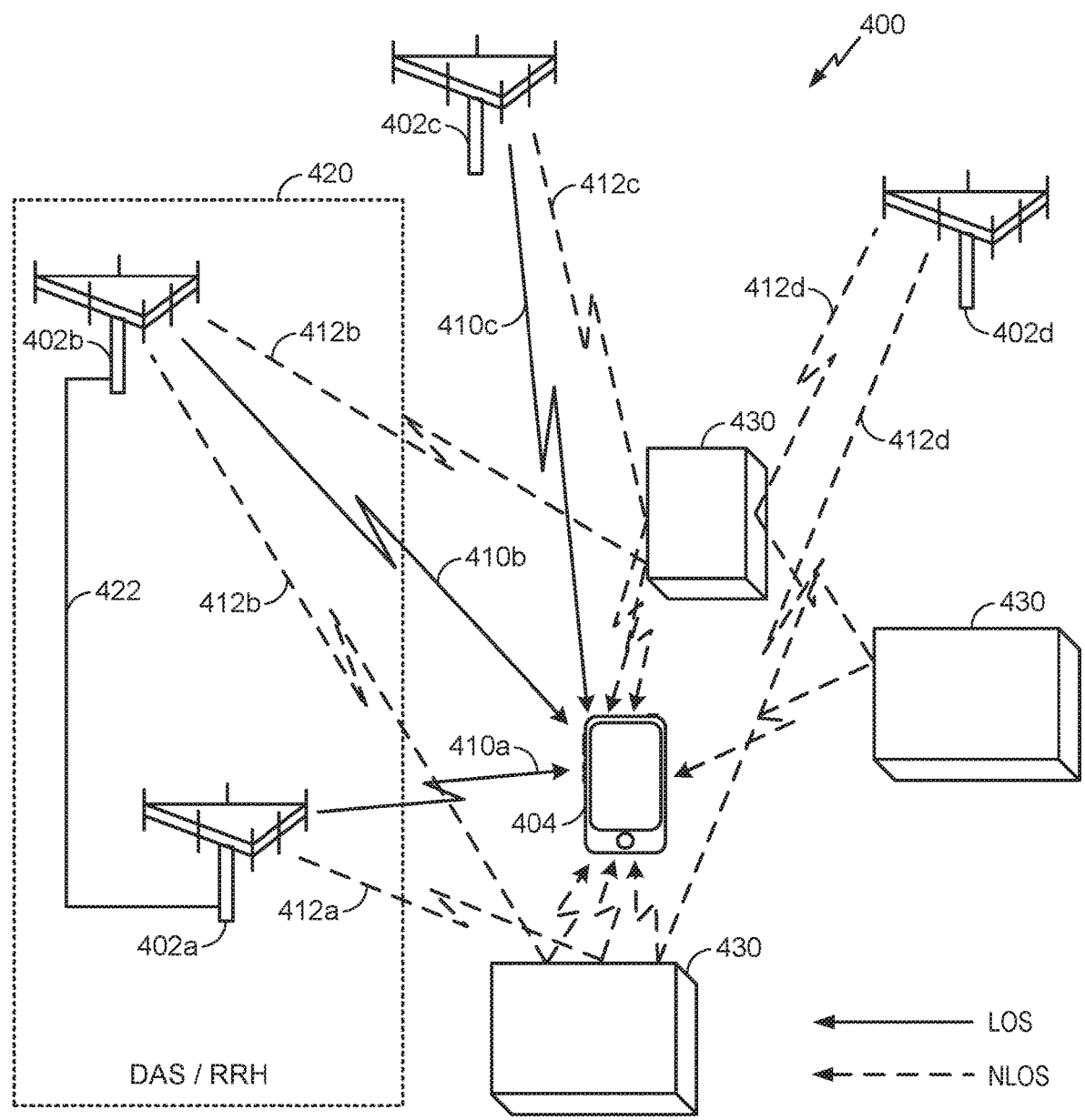
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402*a-d* (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402*a* and 402*b* form a DAS/RRH 420. For example, the base station 402*a* may be the serving base station of the UE 404 and the base station 402*b* may be a neighbor base station of the UE 404. As such, the base station 402*b* may be the RRH of the base station 402*a*. The base stations 402*a* and 402*b* may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402*a* transmitting over an LOS path 410*a* and an NLOS path 412*a*, base station 402*b* transmitting over an LOS path 410*b* and two NLOS paths 412*b*, base station 402*c* transmitting over an LOS path 410*c* and an NLOS path 412*c*, and base station 402*d* transmitting over two NLOS paths 412*d*. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW where typically large number of antenna elements can be used to create narrow transmit beams, they may not be the same beams. As described below with reference to FIG. 5, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
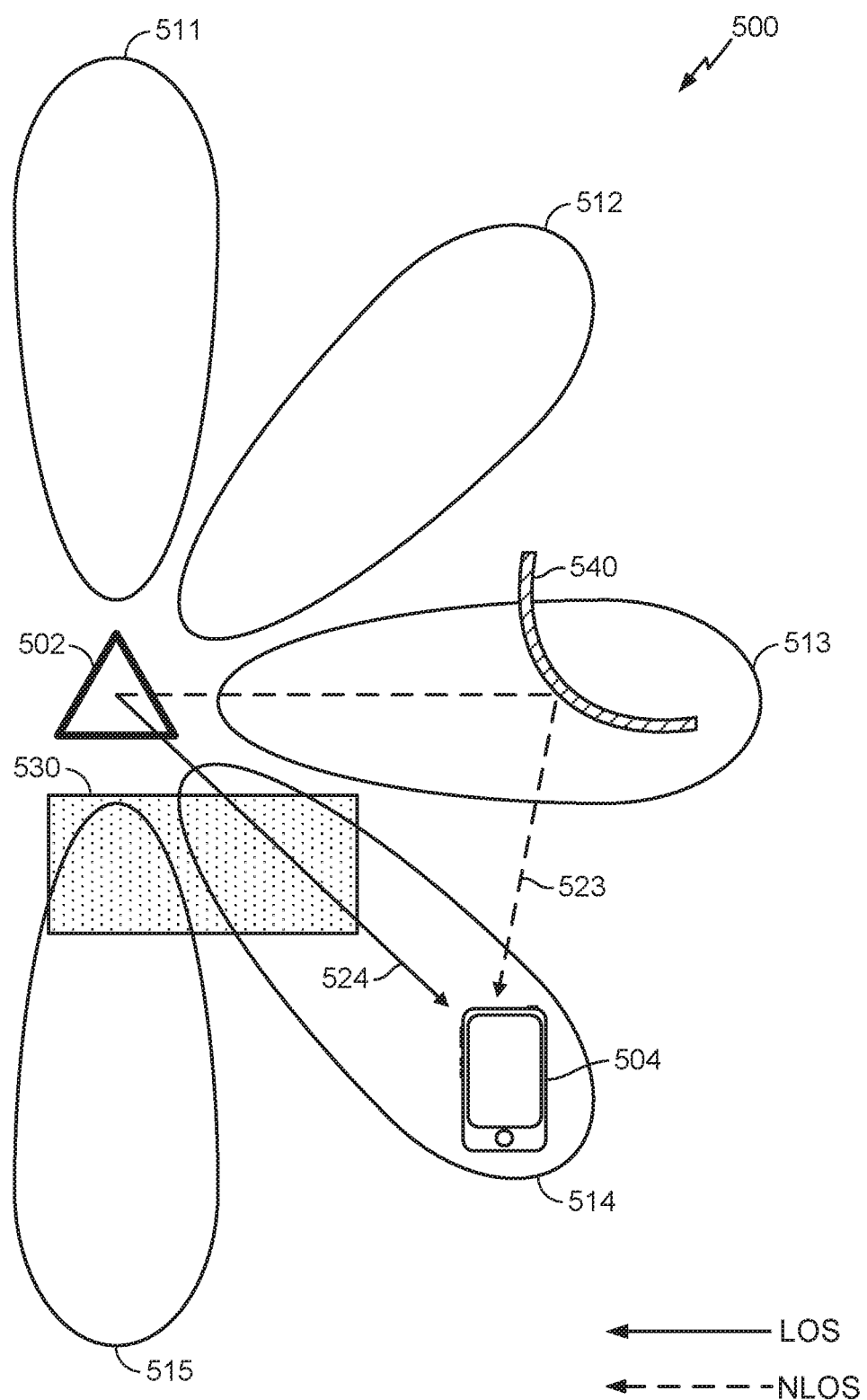
FIG. 5 illustrates an exemplary wireless communications system according to various aspects of the disclosure.

FIG. 5 illustrates an exemplary wireless communications system 500 according to various aspects of the disclosure. In the example of FIG. 5, a UE 504, which may correspond to UE 404 in FIG. 4, is attempting to calculate an estimate of its position, or to assist another entity (e.g., a base station or core network component, another UE, a location server, a third party application, etc.) to calculate an estimate of its position. The UE 504 may communicate wirelessly with a base station 502, which may correspond to one of base stations 402 in FIG. 4, using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams, as will be appreciated, there may be more or fewer than five beams, beam shapes such as peak gain, width and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam to is say that the antenna port(s) used for the transmission of first RF signal are spatially quasi-collocated with the antenna port(s) used for the transmission of the second RF signal.

In the example of FIG. 5, the UE 504 receives an NLOS data stream 523 of RF signals transmitted on beam 513 and an LOS data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS data stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS data stream 524 is directed at the UE 504 but passes through an obstruction 530 (e.g., vegetation, a building, a hill, a disruptive environment such as clouds, etc.), which may significantly degrade the RF signal. As will be appreciated, although the LOS data stream 524 is weaker than the NLOS data stream 523, the LOS data stream 524 will arrive at the UE 504 before the NLOS data stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS data stream 523. The beam of interest for position estimation, however, would be the beam 514, as it carries the strongest LOS data stream 524, despite being obstructed.

Figure 6A:
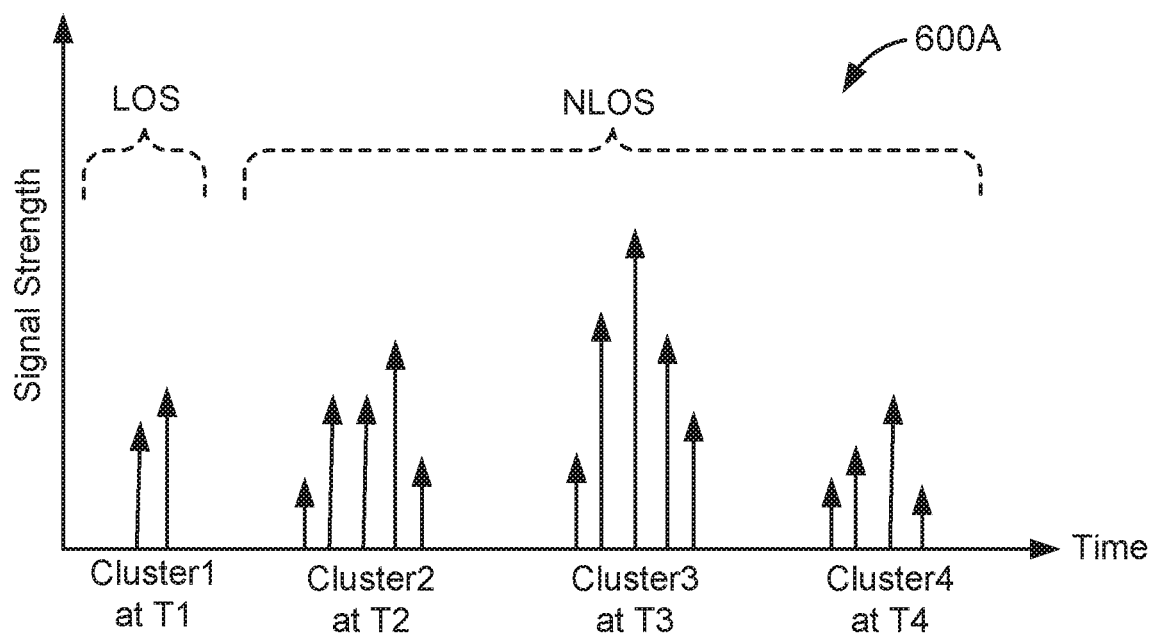
FIG. 6A is a graph showing the arrival of RF signals at a UE over time according to aspects of the disclosure.
Figure 6B:
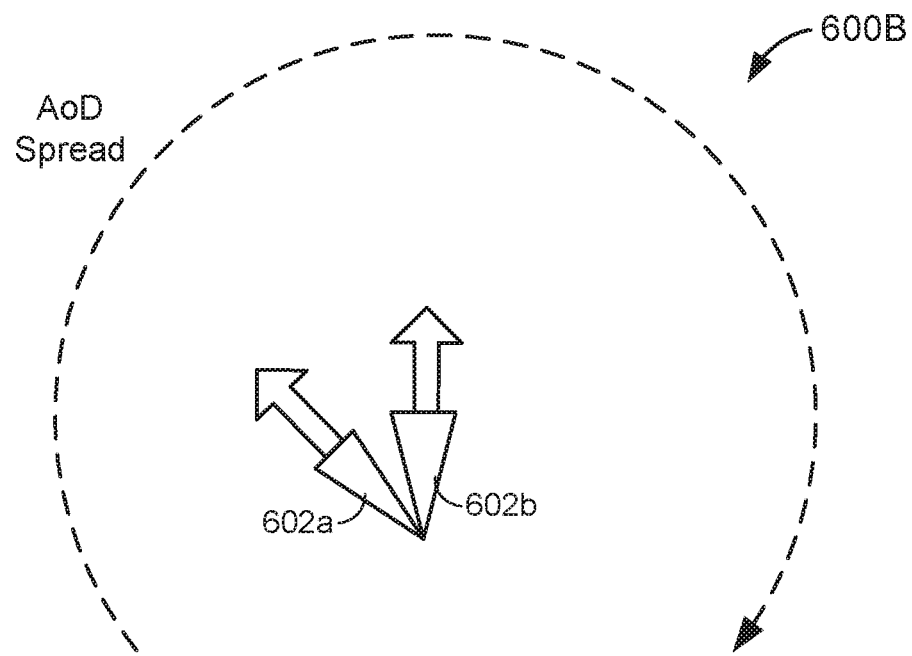
FIG. 6B illustrates an exemplary separation of clusters in Angle of Departure (AoD) according to aspects of the disclosure.

FIG. 6A is a graph 600A showing the RF channel response at a receiver (e.g., UE 504) over time according to aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS data stream (i.e., the data stream arriving over the LOS or the shortest path), and may correspond to the LOS data stream 524. The third cluster at time T3 is comprised of the strongest RF signals, and may correspond to the NLOS data stream 523. Seen from the transmitter's side, each cluster of received RF signals may comprise the portion of an RF signal transmitted at a different angle, and thus each cluster may be said to have a different angle of departure (AoD) from the transmitter. FIG. 6B is a diagram 600B illustrating this separation of clusters in AoD. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also partially overlap even though the clusters are separated in time. For example, this may arise when two separate buildings at same AoD from the transmitter reflect the signal towards the receiver. Note that although FIG. 6A illustrates clusters of two to five channel taps, as will be appreciated, the clusters may have a single channel tap or more than five detected channel taps.

As in the example of FIG. 5, the base station may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omni-directional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in some embodiments of the various aspects of the disclosure.

As discussed above, in some frequency bands, the shortest path (which may, as noted above, be a LOS path or the shortest NLOS path) may be weaker than an alternative longer (NLOS) path (over which the RF signal arrives later due to propagation delay). Thus, where a transmitter uses beamforming to transmit RF signals, the beam of interest for data communication—the beam carrying the strongest RF signals—may be different from the beam of interest for position estimation—the beam carrying the RF signals that excite the shortest detectable path. As such, it would be beneficial for the receiver to identify and report the beam of interest for position estimation to the transmitter to enable the transmitter to subsequently modify the set of transmitted beams to assist the receiver to perform a position estimation.

In LTE, for example, a UE can receive positioning beacons from multiple BSs, in a wireless network, compute spatial (e.g., AoA, AoD) and/or temporal (e.g., OTDOA) metrics from the received beacons. These metrics, along with the knowledge of the location of the detected BSs, can then be used to estimate UE's position using multilateration and/or triangulation. For example, the synchronized BSs may each transmit its respective beacon while the UE receives and computes temporal metrics such as OTDOA. The accuracy of position estimate improves if the UE can detect and measure beacons from more of the neighboring BSs. Therefore, positioning beacons are designed to be highly detectable. A Positioning Reference Signal (PRS) in LTE is an example of such a beacon. The detectability of weaker BSs is improved by ⅙ reuse in frequency domain and further by muting of some BSs from time of time; both methods improve detectability by reducing inter-BS interference seen by the UE. However, muting of BSs transmissions reduces the overall efficiency of the network. Accordingly, as will be describe in greater detail below, another method of interference mitigation for a system can be used where positioning beacons are beamswept through the coverage area of a cell.

Figure 7A:
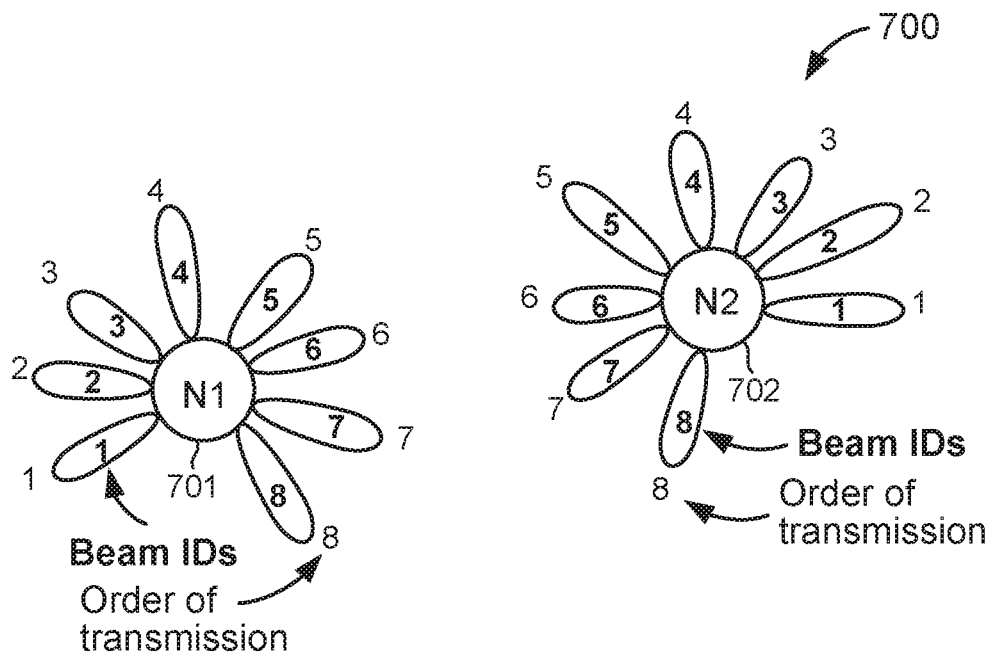
FIG. 7A illustrates an example of beamswept transmissions of two transmission nodes in a first time period.

FIG. 7A illustrates an example of beamswept transmissions of two transmission nodes (e.g., BSs, UEs, etc.). As discussed above, a UE (not shown) can receive positioning beacons from multiple BSs, (e.g., node N1 701 and node N2 702) in a wireless network 700. At higher radio frequencies, the channel between two nodes starts to become sparse, with a few distinct radio paths. Communication at these frequencies therefore often employ beamformed transmission and/or reception, where the beam essentially focuses the signal transmission and/or reception along certain radio paths (e.g., beams IDs 1-8 from nodes N1 701 and N2 702). Some aspects of position estimation require a node to identify the signal received over the shortest radio path, e.g., the LOS (line of sight) path, between the two nodes (e.g., BS and UE).

Similar to synchronization signals (e.g., SS/PBCH block) beamsweeping in 5G-NR, consider the case where two (or more) BSs are periodically cycling through beacon beam transmissions, where the BSs transmit the beacons concurrently. For example, in FIG. 7A, beams (e.g., beam indexes or beam IDs 1-8) from nodes N1 701 and N2 702 can be swept in an ordered transmission 1-8 for each node N1 701, N2 702. For sync signals, the order of the transmission of beams is conventionally identical in each period, in order to facilitate initial access. However, for positioning beacon beams, the order of transmission of beams in each beamsweep period can be permuted (e.g., randomized) in a cell-specific (BS-specific/node-specific) manner. As a result, a "beam of interest" of one BS/transmitting node may collide with different beams of the interfering BS/transmitting node over different periods. And since most beams are typically weak (due to sparsity of radio paths), the chance of persistent high interference is mitigated. Therefore, the sparsity of channels can be used to create on/off-like interference without actually muting an interfering BS. In contrast to the conventional solutions, instead of muting an interfering BS to mitigate interference, the interfering BS can transmit a positioning beacon in a direction that does not cause interference for the target UE/receiving node and may be of use for some other UE/receiving node.

Figure 7B:
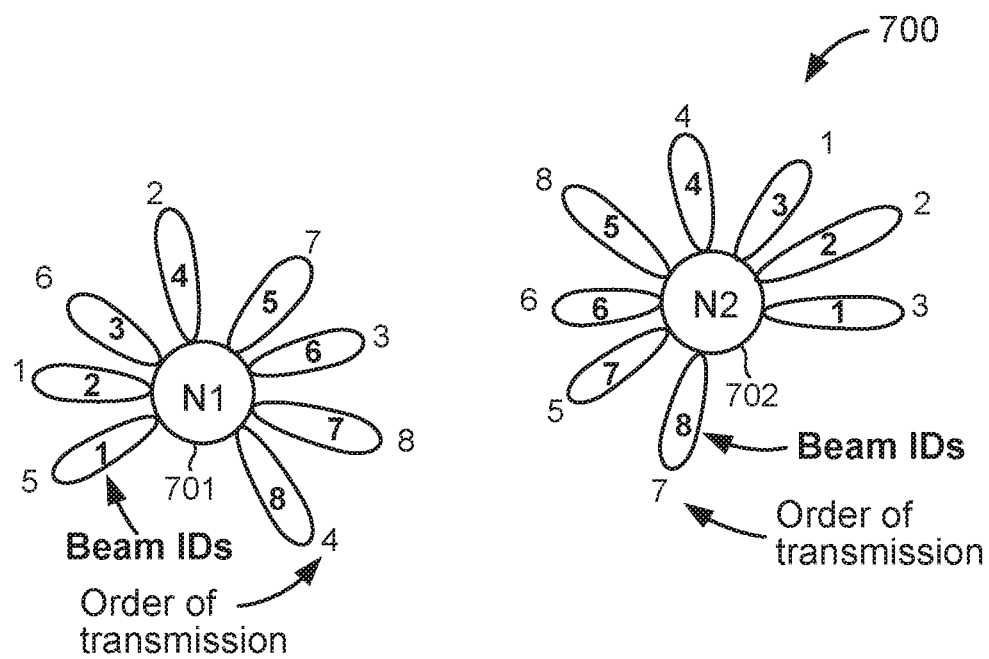
FIG. 7B illustrates an example of beamswept transmissions of two transmission nodes in a second time period.

To further illustrate this aspect, FIG. 7B illustrates an example of beamswept transmissions of two transmission nodes in a second time period. For example, in FIG. 7B, beams (e.g., beam IDs 1-8) from nodes N1 701 and N2 702 can be swept in an ordered transmission 1-8 for each node N1 701, N2 702. When compared to the first time period illustrated in FIG. 7A, it can be seen that although the angle of departure and beam ID of the various beams have remained generally the same for each node N1 701, N2 702, over the two time periods. However, the order of transmission has changed for each node N1 701, N2 702 between the two time periods. For example, beam 1 of node N1 701 was transmitted first in the first time period in FIG. 7A, but beam 2 of node N1 701 was transmitted first in the second time period in FIG. 7B. Likewise, beam 1 of node N2 702 was transmitted first in the first time period in FIG. 7A, but beam 3 of node N2 702 was transmitted first in the second time period in FIG. 7B. Additionally, it will be noted that the other beams may have another order of transmission from the first time period (first beamsweep period) illustrated in FIG. 7A to the second time period (second beamsweep period) illustrated in FIG. 7B.

It will be appreciated the beam IDs, patterns, order of transmission, spatial location, etc. for nodes N1 701 and N2 702 in FIGS. 7A and 7B are solely provided for illustration. Further, although BS and UE are used for illustration purposes as examples of a transmitting node and receiving node for discussion, it will be appreciated that the transmitting nodes and receiving nodes may be any device capable of transmitting and/or receiving. For example, the nodes N1 701 and N2 702 may represent BSs, UEs, small cells, APs, etc.

Figure 8A:
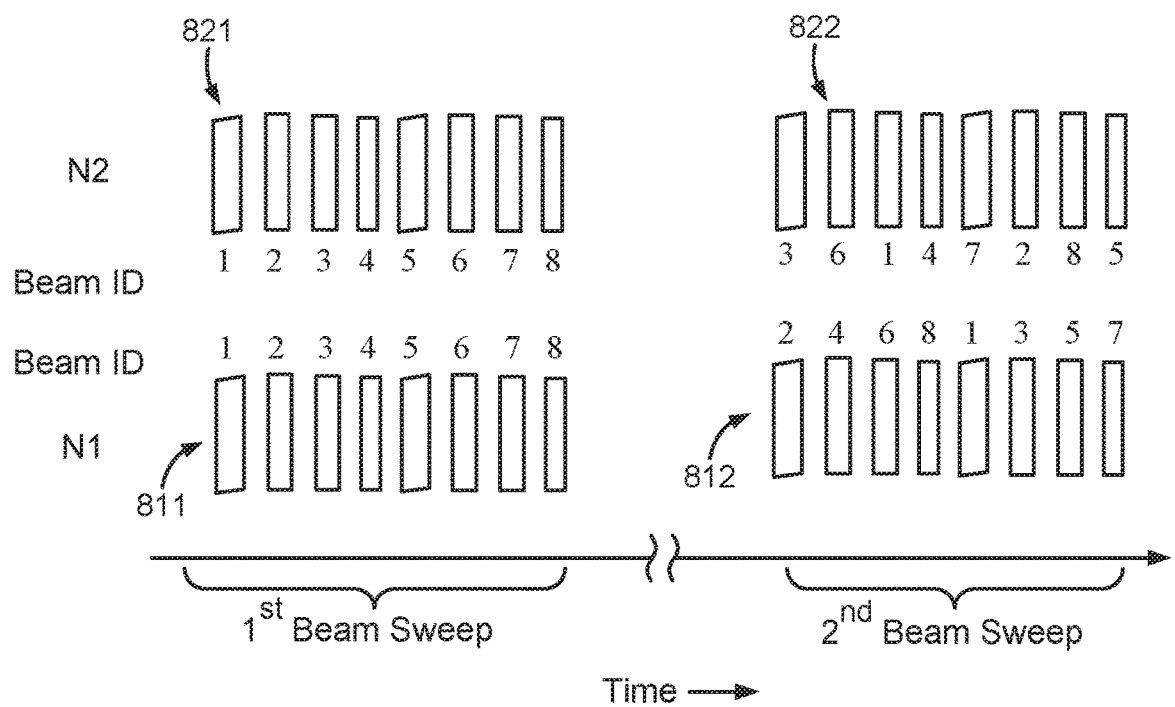
FIG. 8A illustrates permuting an order of transmission for a plurality of beams.

FIG. 8A illustrates permuting an order of transmission for a plurality of beams. For example, a first node N1 transmits positioning beacons using multiple beams (beam IDs 1-8) in a first order of transmission 811 during a first beamsweep period. Subsequently, N1 transmits positioning beacons using the same beams (beam IDs 1-8) in a second order of transmission 812 during a second beamsweep period. For example, the second order of transmission 812 may transmit beams corresponding to beam ID 2, 4, 6, 8, 1, 3, 5, 7, respectively. Each block in the illustration may represent a beam of positioning beacon. The second order of transmission 812 is a permutation of the first order of transmission 811 and the permutation may depend on a node ID (e.g., BS ID), a predetermined pattern (sequence of different transmission orders for the beams), a pattern defined by another network entity, etc. In other words, the order of transmission of beams may depend on time of transmission (e.g., beamsweep period) and a cell- or network specific parameter (e.g., a cell ID, a cell-specific pseudorandom sequence initialization, network ID, etc.).

Further, as illustrated in FIG. 8A, a second node N2 (e.g., BS with a different ID), may use a permutation that is different from the permutation used by the first node N1. For example, second node N2 transmits positioning beacons using multiple beams (beam IDs 1-8) in a first order of transmission 821 during the first beamsweep period. Subsequently, second node N2 transmits positioning beacons using the same beams (beam IDs 1-8) in a second order of transmission 822 during a second beamsweep period. For example, the second order of transmission 822 may transmit beams corresponding to beam ID 3, 6, 1, 4, 7, 2, 8, 5, respectively.

Figure 8B:
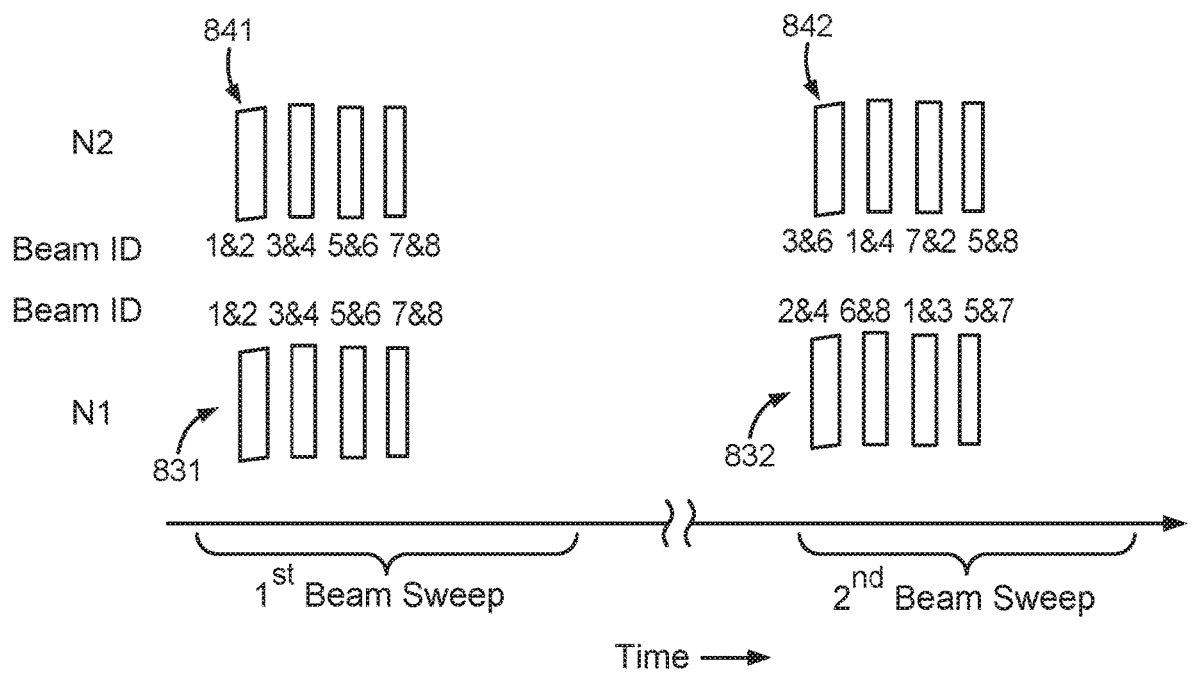
FIG. 8B illustrates permuting an order of transmission for a plurality of beams with simultaneous transmission of two beams.

FIG. 8B illustrates another aspect for permuting an order of transmission for a plurality of beams. As discussed above, each block may represent a beam of a positioning beacon. However, more generally, each block may represent a beam group (multiple beams that the node is able to transmit simultaneously, where each beam is allocated different frequency and/or code resources.) Accordingly, there is another type of permutation that is possible in a system where a node can transmit multiple beams at the same time. For example, as illustrated in FIG. 8B, the first node N1 transmits positioning beacons using multiple beams (beam IDs 1-8) in a first order of transmission 831 during a first beamsweep period. However, in this case the multiple beams are simultaneously transmitted (e.g., 1&2, 3&4, 5&6, 7&8). Subsequently, N1 transmits positioning beacons using the same beams (beam IDs 1-8) in a second transmission order 832 during a second beamsweep period again with multiple beams being transmitted simultaneously. For example, the second order of transmission 832 may simultaneously transmit beams 2&4, 6&8, 1&3, 5&7, respectively.

Likewise, as noted above, the second node N2 may use a permutation that is different from the permutation used by the first node N1. For example, second node N2 transmits positioning beacons using multiple beams (beam IDs 1-8) in the first order of transmission 841, where multiple beams are simultaneously transmitted (e.g., 1&2, 3&4, 5&6, 7&8) during the first beamsweep period. Subsequently, second node N2 transmits positioning beacons using the same beams (beam IDs 1-8) in the second order of transmission 842 during a second beamsweep period. For example, the second order of transmission 842 may simultaneously transmit beams 3&6, 1&4, 7&2, 5&8, respectively.

It will be appreciated that the foregoing illustrations and examples are not limiting to the various aspects disclosed herein. The illustrated first and second orders are merely examples. Likewise, it will be appreciated that, although only first and second orders of transmissions are discussed, additional permutations of orders of transmissions of positioning beacon beams could be generated (e.g., third, fourth, fifth, etc.) for each node and each of the orders of transmissions may be different to further mitigate interference.

As discussed above, generally the node transmitting the beacons is described as a BS. However, as also noted, the node transmitting could also be a UE, where the UE permutes the order of beams in each beamsweep period based on its ID (e.g., an ID provided by a BS, location server, or other network entity specifically for the purpose of positioning beacon beam permutation.) In this case, permutation of the order of transmissions from the UE mitigates/randomizes inter-UE interference at a receiving BS or other receiving node.

The beam hopping or permutation aspects discussed herein are even more appealing at higher carrier frequencies where the receiver may employ hybrid beamforming and can only use one receive beam per diversity branch at a time. When a receiver intends to receive a respective beacon beam from two different transmitting nodes, the most-suited receive beam (e.g., one that produces the most reliable time of arrival estimate from the received signal) for receiving the beacon beam of interest from the first transmission node will typically be different from the most-suited receive beam for receiving the beacon beam of interest from the second transmission node. If the order of transmission of beams is permuted in transmission node specific manner, then the respective beams of interest from the two transmitting nodes will not persistently collide, and thus the receiver will be able to often receive both beams of interest using their respective most-suited receive beam. Furthermore, at higher frequencies, interference mitigation through low reuse in frequency domain (such as ⅙ reuse/comb of an LTE PRS that uses 15 KHz subcarrier spacing (SCS)) may not be always feasible at higher carrier frequencies where subcarrier spacing is also greater (e.g., 120 KHz, 240 KHz). For example, a ⅙ comb in frequency creates 6 repetitions of the signal within one symbol duration, and may create time of arrival ambiguity if the propagation delay is comparable to ½*⅙ of the symbol duration (e.g., 1/240 KHz*⅙*½=347 ns propagation delay or a link distance of 104 m).

Figure 9:
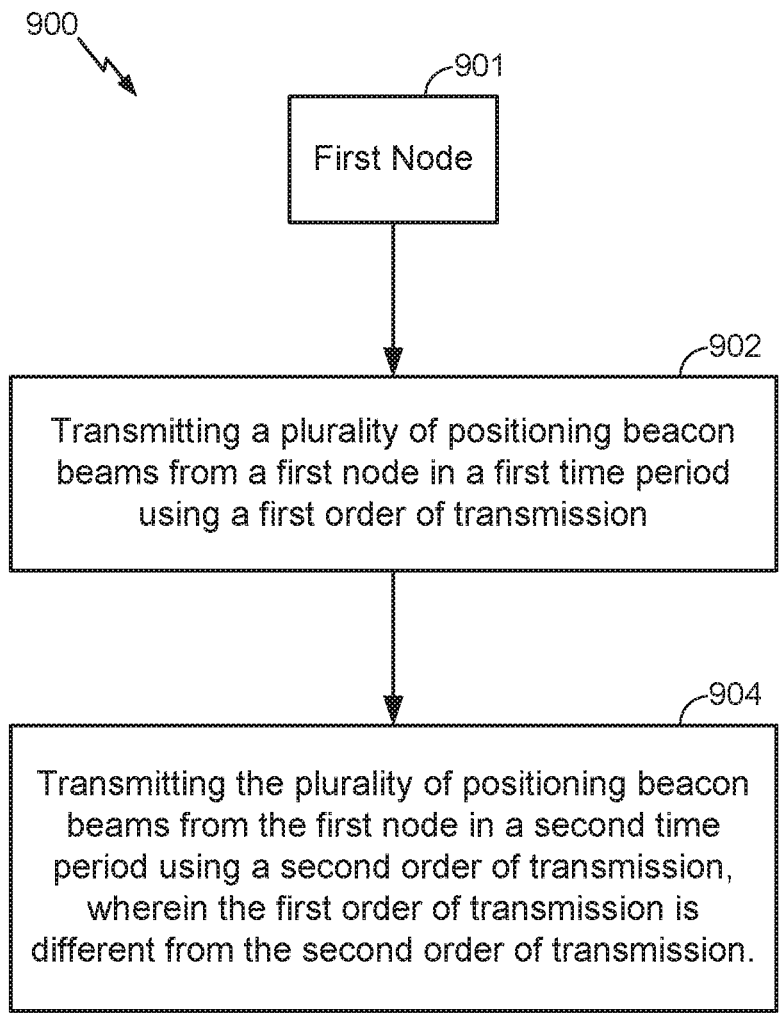
FIG. 9 illustrates an exemplary method for transmitting positioning beacon beams according to an aspect of the disclosure.

FIG. 9 illustrates an exemplary method 900 for transmitting positioning beacon beams according to an aspect of the disclosure. For example, the method 900 may be performed by a first node 901. At 902, the first node 901 transmits a plurality of positioning beacon beams in a first time period using a first order of transmission (e.g., 811, beams 1-8 in FIG. 8A). At 904, the first node 901 then transmits the plurality of positioning beacon beams in a second time period using a second order of transmission (e.g., 812, beams 1-8 in FIG. 8A). As discussed above, the first order of transmission is different from the second order of transmission. It will be appreciated that these transmission patterns advantageously allow interference to be mitigated without muting or other techniques that could negatively impact the overall efficiency of the wireless system.

Further, exemplary methods can include transmitting the plurality of positioning beacon beams from the first node in at least one additional time period using at least one additional order of transmission, wherein each order of transmission is different. Further, exemplary methods can also include two or more beams of the plurality of beams being simultaneously transmitted, where the two or more beams simultaneously transmitted in the first time period are different combinations of two or more beams transmitted in the second time period (e.g., see FIG. 8B as an illustration). Additional exemplary methods can include a second node transmitting a second plurality of positioning beacon beams in the first time period using a first order of transmission for the second node (e.g., 821, beams 1-8 in FIG. 8A). The second node then transmits the second plurality of positioning beacon beams in the second time period using a second order of transmission for the second node (e.g., 822, beams 1-8 in FIG. 8A), where the first order of transmission for the second node is different from the second order of transmission for the second node.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In view of the foregoing, it will be appreciated that various aspects disclosed herein may include various means for performing the functionalities, processes and/or steps described herein. It will be appreciated that the means for performing these aspects may be any of the elements, devices, components and/or structures disclosed herein and/or equivalents. Further, it will be appreciated that various design choices may allowed one skilled in the art to combine the functionalities into one element or distribute the functionalities between multiple elements. Further, the same element may be used for multiple means, either solely or in combination with other disclosed elements. For example, the nodes may be base station 310 and/or UE 350. For example, base station 310 may include one or more processing systems (e.g., processor 375, TX processor 316, etc.) and memory 376, as discussed in the foregoing, which may be used with the receiver(s) RX and/or transmitter(s) TX 318, 320 to perform one or more functions disclosed herein and which may be used alone or in combination with other elements to perform other functions disclosed herein.

Accordingly, the various aspects may include an apparatus including means for transmitting a plurality of positioning beacon beams from a first node in a first time period using a first order of transmission. Additionally, the apparatus includes means for transmitting the plurality of positioning beacon beams from the first node in a second time period using a second order of transmission, wherein the first order of transmission is different from the second order of transmission.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

In view of the foregoing, it will be appreciated that various aspects disclosed herein may include a non-transitory computer-readable medium storing at least one computer-executable instruction for transmitting positioning beacon beams, the at least one computer-executable instruction includes at least one instruction to transmit a plurality of positioning beacon beams from a first node in a first time period using a first order of transmission. Additionally, the non-transitory computer-readable medium includes at least one instruction to transmit the plurality of positioning beacon beams from the first node in a second time period using a second order of transmission, wherein the first order of transmission is different from the second order of transmission.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for transmitting positioning beacon beams, comprising:
   transmitting a plurality of positioning beacon beams from a first node in a first time period using a first order of transmission;
   transmitting the plurality of positioning beacon beams from the first node in a second time period using a second order of transmission, wherein the first order of transmission is different from the second order of transmission, wherein the second order of transmission is permuted based on a cell-specific pseudorandom sequence initialization; and
   transmitting the plurality of positioning beacon beams from the first node in at least one additional time period using at least one additional order of transmission, wherein each order of transmission is different.

2. The method of claim 1, wherein the first time period is a first beamsweep period and the second time period is a second beamsweep period.

3. The method of claim 1, wherein each beam of the plurality of positioning beacon beams is associated with a beam index.

4. The method of claim 1, wherein two or more beams of the plurality of positioning beacon beams are simultaneously transmitted.

5. The method of claim 4, wherein the two or more beams simultaneously transmitted in the first time period are different combinations of two or more beams transmitted in the second time period.

6. The method of claim 4, wherein each beam is allocated different frequency and/or code resources.

7. The method of claim 1, wherein the first node transmits the plurality of positioning beacon beams at different angles of departure.

8. The method of claim 7, wherein the first node transmits the plurality of positioning beacon beams on an extremely high frequency (EHF) band.

9. The method of claim 8, wherein the EHF band comprises a millimeter wave (mmW) frequency band.

10. The method of claim 1, wherein the first node is a base station, a user equipment (UE), a small cell, or an access point.

11. The method of claim 1, wherein the first order of transmission and/or the second order of transmission is based on a network specific parameter.

12. A method for transmitting positioning beacon beams, comprising:

transmitting a plurality of positioning beacon beams from a user equipment (UE) in a first time period using a first order of transmission; and transmitting the plurality of positioning beacon beams from the UE in a second time period using a second order of transmission, wherein the first order of transmission is different from the second order of transmission and the second order of transmission is permuted based on a network specific parameter which is provided by another network entity in communication with the UE.

13. The method of claim 1, further comprising:

transmitting a second plurality of positioning beacon beams from a second node in the first time period using a first order of transmission for the second node; and transmitting the second plurality of positioning beacon beams from the second node in the second time period using a second order of transmission for the second node, wherein the first order of transmission for the second node is different from the second order of transmission for the second node.

14. The method of claim 13, wherein the second order of transmission for the second node is different from the second order of transmission for the first node.

15. The method of claim 13, wherein two or more beams of the second plurality of positioning beacon beams are simultaneously transmitted.

16. The method of claim 13, wherein the second node transmits the second plurality of positioning beacon beams at different angles of departure.

17. The method of claim 16, wherein the second node transmits the second plurality of positioning beacon beams on an extremely high frequency (EHF) band.

18. The method of claim 17, wherein the EHF band comprises a millimeter wave (mmW) frequency band.

19. An apparatus configured to transmit positioning beacon beams, comprising:

a transceiver of a first node configured to transmit a plurality of positioning beacon beams from the first node in a first time period using a first order of transmission;

the transceiver of the first node further configured to transmit the plurality of positioning beacon beams from the first node in a second time period using a second order of transmission, wherein the first order of transmission is different from the second order of transmission, wherein the second order of transmission is permuted based on a cell-specific pseudorandom sequence initialization; and the transceiver of the first node further configured to transmit the plurality of positioning beacon beams from the first node in at least one additional time period using at least one additional order of transmission, wherein each order of transmission is different.

20. The apparatus of claim 19, wherein the first time period is a first beamsweep period and the second time period is a second beamsweep period.

21. The apparatus of claim 19, wherein the first node is a base station, a user equipment (UE), a small cell, or an access point.

22. The apparatus of claim 21, wherein the apparatus is the first node.

23. The apparatus of claim 19, wherein the first order of transmission and/or the second order of transmission is based on a network specific parameter.

24. An apparatus for transmitting positioning beacon beams, comprising:

means for transmitting a plurality of positioning beacon beams from a first node in a first time period using a first order of transmission;

means for transmitting the plurality of positioning beacon beams from the first node in a second time period using a second order of transmission, wherein the first order of transmission is different from the second order of transmission, wherein the second order of transmission is permuted based on a cell-specific pseudorandom sequence initialization; and means for transmitting the plurality of positioning beacon beams from the first node in at least one additional time period using at least one additional order of transmission, wherein each order of transmission is different.

25. The apparatus of claim 24, wherein the first node is a base station, a user equipment (UE), a small cell, or an access point.

26. The apparatus of claim 25, wherein the apparatus is the first node.

27. The method of claim 12, wherein the network entity is a location server.

28. The method of claim 12, wherein the network entity is a base station.

29. A user equipment (UE) configured to transmit positioning beacon beams, comprising:

a transceiver configured to transmit a plurality of positioning beacon beams from the equipment (UE) in a first time period using a first order of transmission; and the transceiver further configured to transmitting the plurality of positioning beacon beams from the UE in a second time period using a second order of transmission, wherein the first order of transmission is different from the second order of transmission and the second order of transmission is permuted based on a network specific parameter which is provided by another network entity in communication with the UE.

30. A user equipment (UE) configured to transmit positioning beacon beams, comprising:

means for transmitting a plurality of positioning beacon beams from the UE in a first time period using a first order of transmission; and means for transmitting the plurality of positioning beacon beams from the UE in a second time period using a second order of transmission, wherein the first order of transmission is different from the second order of transmission and the second order of transmission is permuted based on a network specific parameter which is provided by another network entity in communication with the UE.

* * * * *